Patented July 26, 1949

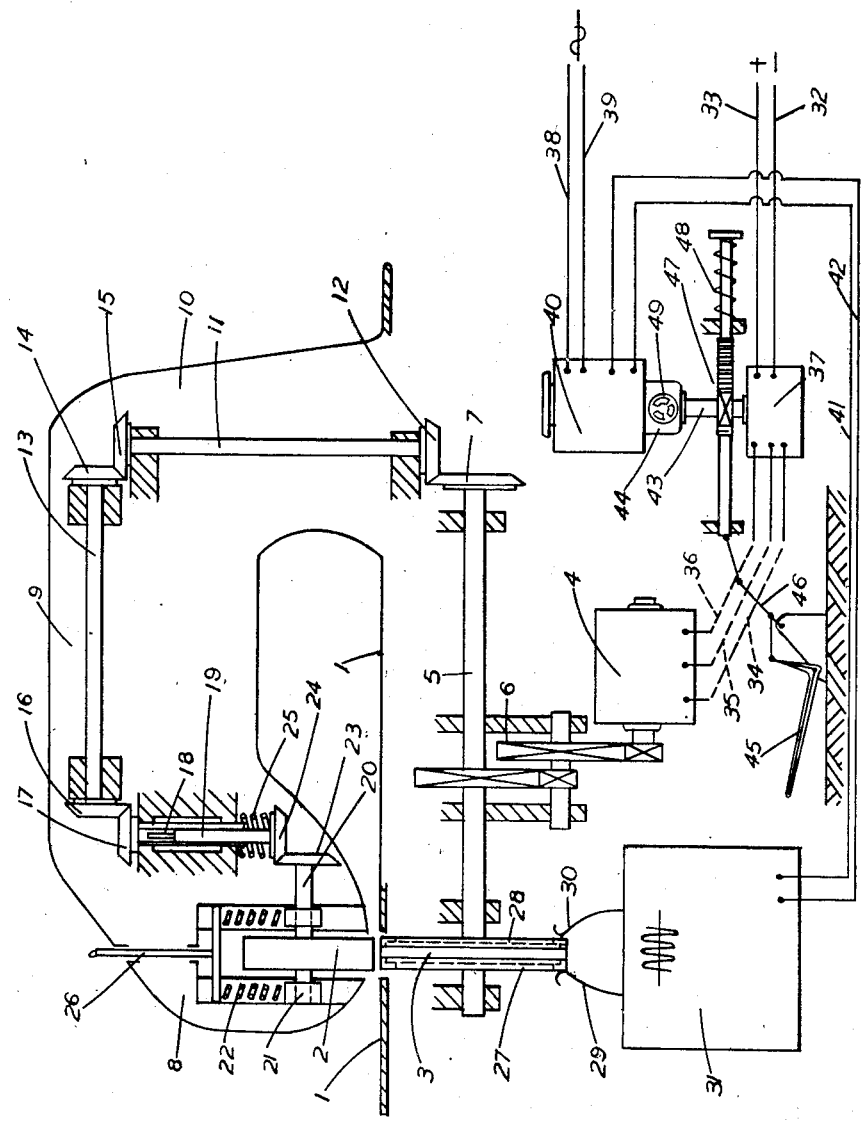

2,477,313

UNITED STATES PATENT OFFICE 2,477,313

MACHINE FOR JOINING SHEET MATERIALS BY THE HEATING EFFECT OF ELECTRIC STRESS ALTERNATING AT HIGH FREQUENCY

Joshua Creer Quayle, Helsby, and Peter Jones, Kelsall, near Chester, England, assignors to British Insulated Callender's Cables Limited, London, England, a British company Application October 9, 1946, Serial No. 702,220 In Great Britain October 25, 1945

1 Claim. (Cl. 219—47)

The invention is concerned with machines to be used for joining sheet materials utilising the heating effect on the materials of electric stress alternating at high frequency by which the material is softened and rendered adhesive so that two superimposed layers pressed together locally in the machine are joined at the region or line of pressure. Such machines carry out operations on appropriate sheet materials of a kind similar to those performed by a sewing machine (with the difference that the application of heat and pressure is used to make a seam instead of stitching) and are, accordingly, structurally similar to sewing machines in that they possess a worktable, on which the materials to be treated are spread and over which they are fed as the seaming proceeds, and have operative parts below the worktable and co-acting operative parts above the table, the upper parts being supported by a standard projecting upward from the table at a distance from the operative point and a horizontal arm overhanging the table from the standard to the working point. The method of manipulation of the material on the machine is also similar to that employed with a sewing machine.

The pressure is applied by rollers, the one carried above the material on the worktable and the other carried below the material. They are preferably both driven. One of them, usually the upper one, is yieldingly mounted under spring pressure. The electric field for heating the material is applied by means of electrodes one placed above the material and one or more below. These electrodes may be provided wholly or in part by the pressure rollers.

The joining is effected, for instance as a seam between two sheets of material, by heating the sheets to the soft adhesive state on the contacting surfaces while pressing them together between the rollers and thus causing the two sheets to coalesce along the line of treatment. During this treatment the materials are carried forward steadily by the rollers so that the material passes quickly into the heating and pressure region and then quickly out of it into a region where the cooling effect of the atmosphere operates upon the joined surfaces so that they remain strongly adhering. The alternating electric stress in the material between the electrodes is obtained by establishing a potential difference between these electrodes by connecting them appropriately with a high frequency oscillator.

The operating conditions of a piece of work may vary considerably due, for instance to changes in the number of layers to be joined, differences in speed of practical operation between straight runs and turns and between other features of the work and in some cases due to differences in the nature of the material where this is not uniform throughout. Operating conditions also vary from one piece of work to another, for instance due to differences in the nature of the materials and in their thickness. The present invention provides control arrangements whereby these conditions are dealt with in a convenient and advantageous manner securing satisfactory joining of the materials throughout and a high average speed of working.

The control of the conditions during running is in accordance with the invention exerted by a single member, preferably foot operated, which is made to adjust simultaneously and in the same sense the speed of the rollers driving the material forward and the high frequency power supplied to the electrodes. As the speed increases the voltage applied to the electrodes also rises and in that way the rate of heating is increased so that the material in its shorter time of passage past the electrodes and pressure members is raised to the required temperature for an effective joining. The relation between speed of rollers and high frequency power may be different for different pieces of work. This is taken care of by the providing for an overriding control for one of the factors, preferably the high frequency voltage, which can be set before commencement of the work and is automatically effective until changed.

The control may, for instance, be exerted by two rotary switches coupled together and operated by a foot pedal, one controlling the motor as by a rheostat and the other the voltage of the high frequency output as by a variable transformer in the supply of power from the mains to the oscillator. The overriding control may be provided by adjustment of the ratio of gearing together of the two rotary switches.

The invention is further described hereinafter with reference, by way of example, to the accompanying drawing, which is a diagrammatic representation of a machine having control arrangements in accordance with the invention.

The machine comprises a worktable 1 on which the materials to be treated are spread and over which they are fed as the seaming proceeds. Pressure is applied by rollers, one roller 2 supported above the worktable 1 and the other 3 supported below the material. Both rollers 2 and 3 are positively driven by an electric motor 4. The motor 4 drives a shaft 5 through reduction gearing 6. On one end of the shaft 5 is fixed the lower roller 3, and on the other end of the shaft is a bevel gear 7 whereby through transmission gearing the drive is supplied to the upper roller 2. The upper roller is supported in the end 8 of a horizontal arm 9 which overhangs the worktable 1 from a standard 10 projecting upward from the table 1 at a distance from the two rollers 2 and 3. The transmission from the bevel gear 7 to the upper driven roller is obtained by a vertical shaft 11 driven by engagement of a bevel gear 12 at its lower end with the first mentioned bevel gear 7. A horizontal driven shaft 13 disposed in the horizontal arm 9 carries at one end a bevel gear 14 in engagement with a bevel gear 15 fixed to the upper end of the vertical shaft 11. At the forward end of the horizontal shaft 13 is fixed another bevel gear 16 which engages a bevel gear 17 fixed to the upper end of a two-part vertical shaft. The latter shaft comprises a hollow upper part 18 and a lower part 19 adapted to slide therein and connected thereto by splines so that the two parts rotate together. The upper roller 2 is fixed to a shaft 20 carried in a bearing assembly 21 yieldingly mounted on compression springs 22 and capable of limited vertical movement. A bevel gear 23 on the rearward end of the shaft 20 is engaged by a bevel gear 24 fixed to the lower part 19 of the two-part vertical shaft. A compression spring 25 behind the last mentioned bevel gear 24 maintains that gear in engagement with the bevel gear 23 during vertical movement of the upper roller 2. The upper and lower rollers 2 and 3 form between them the gap through which the material is passed by the driving action of those rollers on the material. A desired pressure may be applied by means of a lever 26 attached to the compression springs 22 associated with the upper roller, and by means of this lever the upper roller 2 may be lifted out of engagement with the lower roller 3.

The lower roller 3 is formed with two electrodes 27 and 28 in the manner described in the specification of United Kingdom Application No. 30,418/45. The body of the roller is made of insulating material and each of the electrodes 27 and 28 is a metallic surface extending over an outer portion of the roller surface and radially inwards for a short distance on the corresponding side of the roller. The electrodes 27 and 28 are connected by side spring contacts 29 and 30 respectively to the terminals of a high frequency oscillator 31. The upper roller 2 acts as a third electrode, and also as the pressure roller to press together the layers of thermoplastic material arranged between the two rollers. When under the influence of the high frequency alternating electric stress in the material between the rollers, the contacting surfaces are heated to a soft adhesive state, the pressure of the upper roller 2 presses them together so that they coalesce along the line of treatment. The driven rollers 2 and 3 carry the material steadily forward to form a seam.

The motor 4 is a direct current operated machine; the direct current supply is over the two lines 32 and 33, through a rotary variable rheostat 37, and over the three lines 34, 35, and 36 to the motor. The variable rheostat 37 permits control of the voltage applied to the motor armature, and thereby controls the speed of the motor. The supply to the oscillator is obtained from a source of alternating current over two lines 38 and 39 to a variable transformer 40, and from the transformer to the oscillator over two lines 41 and 42. By adjustment of the transformer 40, the output voltage from the oscillator to the roller electrodes may be controlled. A common rotatable shaft 43 couples together the rotatable parts of the variable transformer 40 and the variable rheostat 37, a variable gear 44 being arranged in the coupling to the variable transformer. A foot-operated pedal 45 is connected through a linkage 46 to a rack-and-pinion drive 47 whereby rotation of the shaft 43 may be effected. A tension spring 48 facilitates the proper control of the shaft by the pedal 45. In the one extreme position when the pedal 46 is completely released, the mechanism of the adjustable members 40 and 37 may be arranged to interrupt the supply to the motor 4 and oscillator 31.

When the materials to be joined involve a straight run through the machine, the speed of the motor may be increased by operating the pedal 45. At the same time the voltage applied to the electrodes from the oscillator 31 will also be increased, so that the rate of heating of the material will increase as required by its shorter time of passage between the rollers 2 and 3. When, due to the presence of turns and other features, it is necessary to reduce the speed of the rollers by releasing the pedal, the voltage across the electrodes will fall correspondingly. The relation between rates of variation of voltage and speed is pre-set by means of a hand control 49 of the variable gear 44 in the coupling 43 between the variable members 37 and 40. This relation will be pre-set, before commencement of the work, in accordance with the particular conditions, for instance, the nature and thickness of the material and the degree of heating required at the surfaces to be joined. Once pre-set, the particular relation will be automatically effective throughout the range of control of the variable members 37 and 40, until again changed by hand.

It is preferred to use a direct current motor and to exert the control solely or primarily by operating on the voltage applied to the armature of that motor. The field of the motor is independently excited, that is to say it is not under control simultaneously with the armature voltage. It may be a permanent magnet. The armature voltage is adjusted by the control so as to obtain an approximately constant torque, that is approximately constant current at all speeds. It is preferable to provide a series winding on the field through which the armature current, or a proportion of it, passes, acting in such a sense as to prevent drop of speed with increase of mechanical load of the motor, or even to produce an increase of speed when the load increases and also to prevent increase of speed when the mechanical load falls off, or even to produce a decrease. This is found advantageous for dealing with local load variations such as occur at the step up or down from one thickness of material to another due to the change in the number of layers for instance, where no manipulated control change is made. The advantage of this automatic speed control in maintaining stability of working will be recognised on noting that a large part of the resistance to the movement of the rolls driven by the motor is due to the plasticity of the materials while passing between the rolls (increasing as the plasticity increases). Accordingly, if a rise of speed occurs without any simultaneous manipulative control of the heating effect the temperature reached in the material while passing between the rolls falls. Accordingly, the plasticity falls and the resistance to movement of the rollers falls so that the speed tends further to increase. This tendency is corrected by the effect of compounding of the motor.

The high frequency oscillator may be of the form described in the specification of United States application Serial No. 702,219, filed October 9, 1946, now Patent No. 2,469,990, issued May 10, 1949, in which the output voltage is variable by means of a mechanically movable device incorporated in the oscillator construction. In such case, the single member for controlling the conditions in accordance with the present invention will be adapted to adjust simultaneously the speed controller for the rollers and the movable device incorporated in the oscillator.

What we claim as our invention is:

In a machine for joining superimposed layers of thermo-plastic material as along a seam by subjection of the contacting surfaces of the material to heating by a high frequency alternating electric field during movement of the material between pressure roller electrodes, an electric motor drive for at least one of said roller electrodes to impart said movement of the material, a variable speed-controller for said motor, an oscillator connected with and adapted to supply said alternating electric field between said roller electrodes, a variable oscillator-output controller for varying the intensity of said field, coupling means connecting together said speed controller and said oscillator-output controller, a single operable member adapted through said coupling means to vary simultaneously and in the same sense said speed controller and said oscillator-output controller, and in said coupling means a variable over-riding controller for the relation between the rates of variation of speed of said motor and intensity of said field.

JOSHUA CREER QUAYLE.
PETER JONES.

REFERENCES CITED

The following references are of record in the file of this patent:

UNITED STATES PATENTS

| Number | Name | Date |
|---|---|---|
| 1,023,316 | Hurwitz | Apr. 16, 1912 |
| 2,391,086 | Crandell | Dec. 18, 1945 |

FOREIGN PATENTS

| Number | Country | Date |
|---|---|---|
| 118,453 | Australia | May 11, 1944 |
| 159,570 | Great Britain | Feb. 24, 1921 |

OTHER REFERENCES

Plastics, September 1944, pages 30 and 32.
Radio Sealing, Wireless World, January 1945, page 29.
Plastics, September 1945, page 138.
Modern Packaging, May 1946, pages 120, 121.